United States Patent [19]

Sluss et al.

[11] Patent Number: 4,710,941
[45] Date of Patent: Dec. 1, 1987

[54] PERFORATED ELECTRODES FOR EFFICIENT GAS TRANSFER IN CW $CO_2$ WAVEGUIDE LASERS

[75] Inventors: Elmer C. Sluss; John E. Nettleton; Dallas N. Barr, all of Prince William County, Va.

[73] Assignee: The United States of America as represented by the Secretary of the Army, Washington, D.C.

[21] Appl. No.: 935,360

[22] Filed: Nov. 26, 1986

[51] Int. Cl.[4] .............................. H01S 3/02; H01S 3/22
[52] U.S. Cl. ........................................ 372/87; 372/34; 372/58; 372/59; 372/64; 372/65
[58] Field of Search .................... 372/87, 64, 58, 59, 372/65, 34, 81, 82, 83

[56] References Cited

U.S. PATENT DOCUMENTS

| | | | |
|---|---|---|---|
| 3,815,047 | 6/1979 | Smith et al. | 372/64 |
| 4,064,465 | 12/1977 | Hundstad et al. | 372/87 |
| 4,637,031 | 1/1987 | Gürs et al. | 372/87 |

Primary Examiner—James W. Davie
Assistant Examiner—Xuan Vo
Attorney, Agent, or Firm—Max L. Harwell; John E. Holford; Anthony T. Lane

[57] ABSTRACT

A gas laser is provided with elongated electrodes having apertures therein. The electrodes provide a transmission line for an HF electromagnetic pump which ionizes the gas, and the apertures are distributed and offset to provide passageways for efficient interaction between the hot ionized gas and a replenishing supply of cooled gas.

5 Claims, 2 Drawing Figures

PERFORATED ELECTRODES FOR EFFICIENT GAS TRANSFER IN CW CO₂ WAVEGUIDE LASERS

The invention described herein may be manufactured, used, and licensed by the U.S. Government for Governmental purposes without the payment of any roylaties thereon.

BACKGROUND OF THE INVENTION

1. Field of the Invention

The present invention is in the field of gas laser, particularly continuous wave (CW) lasers pumped by means of a radio-frequency electromagnetic wave generator. The generator is coupled to the lasing gas by means of the electrodes which form a transmission line in a gas containment structure. The gas containment structure is usually a hybride dielectric/metal structure which, in combination with the electrodes also serves as an optical waveguide for the laser output.

2. Prior Art

Numerous systems have been proposed for gas lasers. For high power applications the ionized $N_2$—$CO_2$—$He_2$ laser has proved to be very efficient. The highest powers are achieved with pre-ionized flowing gas, but these are large and cumbersome. Low to medium power applications employ a more convenient arrangement wherein the gas is enclosed and excited in hybrid dielectric/metal optical waveguide containing at least one spaced parallel pair of ionizing electrodes. By using uniform long narrow electrodes, a large ionization region is formed. Such electrodes and ionized gas also provide a transmission line with a characteristic impedance that can be matched to the impedance of a radio-frequency (RF) source of electromagnetic waves to provide the required ionizing potentials. A key to the efficient operation of this laser is the free mobility of the molecules which must cool between emissions by colliding with their surroundings. Unfortunately, a good percentage of this mobility is lost by collision with other molecules which does not always produce useful results. There currently exists no effective passive means of removing the hot gas from the waveguide in the time required for reasonable cooling efficiency.

SUMMARY OF THE INVENTION

The present invention proposes to improve the efficiency of a medium power, sealed, radio frequency pumped carbon dioxide laser as described above by adding perforations to the electrodes. These perforations will be positioned to permit a large number of excited molecules normally trapped between the exciting electrodes to escape, allowing ground state molecules to enter and be pumped to their upper lasing level, thereby increasing the population inversion and efficiency of the laser.

BRIEF DESCRIPTION OF THE DRAWINGS

The invention is best understood with reference to the drawings wherein.

DESCRIPTION OF PREFERRED EMBODIMENT OF INVENTION

Figures 1, 2:
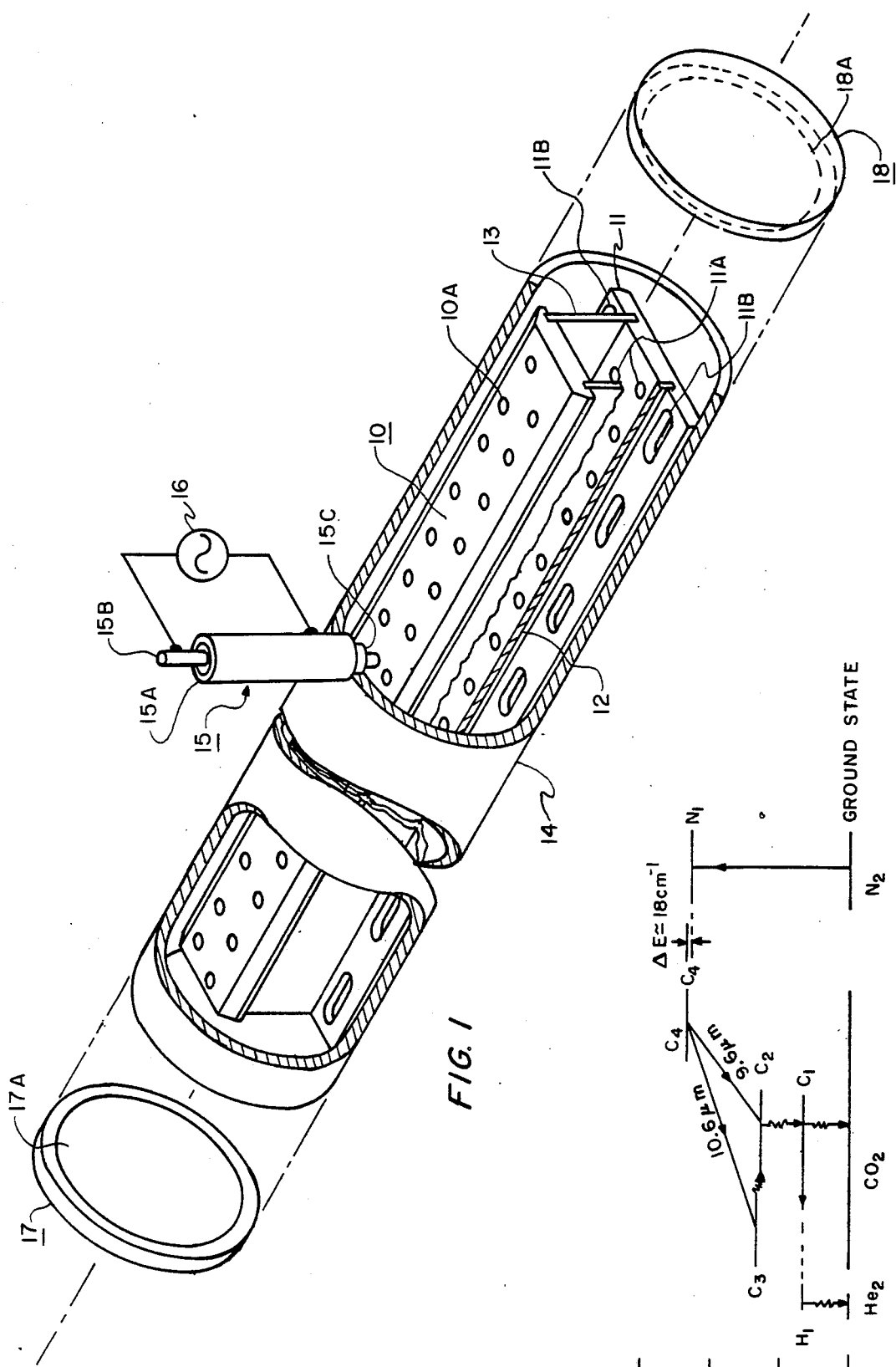
FIG. 1 shows an isomeric view of the novel laser structure with portions cutaway to disclose the perforated electrode structures.
FIG. 2 shows an energy level diagram of the most important energy states involved in the $CO_2$ lasing process.

As shown in FIG. 1 the electrically active componenets of the laser tube consist of two metal electrodes 10 and 11. These have essentially the same central cross-sectional configuration over most of their length. The length is orders of magnitude greater than the maximum cross-sectional dimension. The conductors are maintained in a spaced parallel relationship by means of a pair of ceramic wall members 12 and 13 which are notched into and/or glued to the conductors 10 and 11. The exact spacing and uniformity of these members is essential and must be held to a tolerance of several wavelengths of the output frequency for which the laser is designed. A particularly useful wavelength, for example, is approximately 10 microns in the far-infrared region of the electromagnetic spectrum.

The ends of the structure described above can be sealed to retain a lasing gas mixture inside and thereby form an elementary laser. The endwalls used for sealing, like endwalls 17 an 18 in FIG. 1, must be transparent to the output radiation of the laser. One side of each endwall, preferably the inside wall, may also be coated with a partial reflector 17A and 18A and the latter should be protected with a quarterwave coating of SiO or the like. In many cases these partial reflectors are separate elements outside the laser tube structure. Since the spacing of the reflectors is critical to the formation of the proper Fabry-Perot cavity this arrangement avoids the criticality in the length of the tube.

A preferred arrangement in the present invention, also shown in FIG. 1, is to surround the structure defined by elements 10 through 13 (a waveguide) with a metal shielding tube 14. The ground electrode 11 includes support portions outside the waveguide, making it wider than electrode 10 and these portions are attached directly to the metal shielding tube by brazing, soldering or any method that will not destroy the gas tightintegrity of the shielding tube. A section of rigid coaxial waveguide 15 is attached through an opening in shielding tube 14 by soldering its outer shielding conductor 15A to tube 14 or by any method similar to soldering that will provide good electrical contact and a gas tight seal between elements 14 and 15. The inner coaxial conductor 15B is bonded to the upper electrode so as to make good electrical contact. The insulation 15C must hermetically seal the space between the coaxial conductors, have sufficient strength to withstand atmospheric pressure and be inert to the gases in the waveguide. In operation the coaxial cable is connected to a source of radio-frequency (RF) electromagnetic waves in the usual manner well known in the art.

The waveguide structure thus formed is both a transmission line for RF energy to excite the gas mixture therein and an optical waveguide for the radiation produced by the lasing process. Ionization occurs only within the waveguide where the electrodes have less separation. The ends of the shielding tube 14 are sealed by windows 17 and 18 which are transparent to the laser radiation from the waveguide structure and, again, these may also be coated with partially reflecting mirrors, usually on the interior surfaces, to define a Fabry-Perot cavity. The ends of the waveguide structure are left open to allow circulation and cooling of the gas in the waveguide structure through the reservoir provided by the larger volume of the shielding tube 14.

FIG. 2 shows a map of the most important energy levels involved in the lasing process. The $N_1$ level of nitrogen atom conveniently augments the C4 level of the $CO_2$ atom by collisional resonant energy transfer. The C4 level is metastable and when stimulated emits a photon of 9.6 or 10.6 micron wavelength while going to the C2 level sometimes passing through the C3 level. From there the atoms decays quickly to the C1 level which is also metastable and acts as bottle neck to the re-excitation process. Collisional depopulation of this level is thus necessary through the $H_1$ level of the helium atom, which returns the $CO_2$ molecule to its ground state for a new cycle. The helium molecule must then also decay to its ground state either by collision with the walls or by convective removal and replacement with a ground state molecule. The latter and most desirable process is limited by the presence of the electrodes.

To improve this situation the present invention proposes that the upper and lower electrodes be perforated with small inner conduits 10A and 11A. This provides a normal transverse convective flow in both the waveguide and the shielding tube 14. To support this flow even larger outer conduits or slots are formed in the portions of the ground electrode 11 outside the waveguide. The transverse electric field in the waveguide is concentrated in the center by normal transmission line moding. To avoid distorting the electromagnetic field modes in the waveguide the inner conduits are, therefor, placed near the sidewalls where these fields have minimum intensity. These conduits such as 10A and 11A are staggered along the length of the waveguide to increase the interaction path of streams that pass through the holes and in effect provide most input holes with two equivalent outputs, or vice-versa, to cope with varying thermal gradients in the waveguide. The dielectric walls 12 and 13 support the convective gas flow described above and forming aperatures in these walls would only cause undesired turbulence in this flow. Outside the waveguide, the hottest gas, from conduit 10A, for example, gathers at the top of the metal shielding tube 14 and while cooling flows circumferentially near the surface of this tube through outer conduit 11B to the bottom until it reenters the waveguide via inner conduit 11A. To reduce thermal stress on the dielectric member 15C the entire structure may be inverted and essentially the same results are obtained except that the dielectric member is exposed to the coolest area of gas flow.

The specific gases used not critical, although with helium gas present it might be possible to employ specially small openings for conduits 10A and 11A for a specific application. Square waveguides are generally preferable to avoid mode polarization shifts, but the principles enunciated herein apply equally to round waveguides. While many radar frequencies are useful in this application those in the band 10–100 Mhz are preferred. Apertures 10A and 11A may have diameters up to 20% of the spacing between the dielectric or ceramic walls 12 and 13. The formation of slots 11B on the other hand may remove 50% of the portion of electrode 11 which lies between wall 12 or 13 and the nearest intersection of this electrode with shielding tube 14.

I claim:

1. In a gas laser having a large closed container filled with a gaseous lasing medium and a smaller waveguide mounted in said medium with dielectric sidewalls and isolated elongated metal top and bottom electrodes joining said sidewalls, said electrodes having broad parallel opposing faces to couple to a radio frequency source and propagate radio frequency energy; the improvement comprising:
   a plurality of inner conduits formed through said electrodes normal to the said broad faces of said electrodes, whereby said gaseous medium when heated can flow transversely out of said waveguide through said top electrode and into said waveguide through said bottom electrode.

2. A gas laser according to claim 1 wherein:
   said conduits are staggered on each electrode to provide maximum interaction between the hot gas between said electrodes and the remaining gas in said container.

3. A gas laser according to claim 1 wherein:
   the conduits on one electrode of said pair are staggered relative to those on the other electrode to provide more diverse flow paths in said waveguide.

4. A gas laser according to claim 1 wherein:
   said conduits have a maximum cross-section less than 20% of the width of one of said broad faces.

5. A gas laser according to claim 1 wherein:
   said container is metal, one of said electrodes has a support portion connected to said container and said support portion includes outer conduits larger than said inner conduits.

* * * * *